US009190846B2

(12) United States Patent
Eiland et al.

(10) Patent No.: US 9,190,846 B2
(45) Date of Patent: Nov. 17, 2015

(54) POWER QUALITY MANAGEMENT SYSTEM AND METHODS OF CONTROLLING PHASE UNBALANCE

(75) Inventors: Edward Earl Eiland, Schoharie, NY (US); Owen Jannis Samuel Schelenz, Schenectady, NY (US); Nitin Nandkumar Joshi, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 777 days.

(21) Appl. No.: 13/458,554

(22) Filed: Apr. 27, 2012

(65) Prior Publication Data

US 2013/0286697 A1    Oct. 31, 2013

(51) Int. Cl.
*H02M 7/00* (2006.01)
*H02M 7/48* (2007.01)
*H02J 3/26* (2006.01)

(52) U.S. Cl.
CPC ... *H02J 3/26* (2013.01); *Y02E 40/50* (2013.01)

(58) Field of Classification Search
None
See application file for complete search history.

(56) References Cited

U.S. PATENT DOCUMENTS

| | | | |
|---|---|---|---|
| 6,850,426 B2 | 2/2005 | Kojori et al. | |
| 7,595,613 B2 | 9/2009 | Thompson et al. | |
| 8,379,416 B1 | 2/2013 | Datta et al. | |
| 2007/0170910 A1 | 7/2007 | Chang et al. | |
| 2011/0295437 A1 | 12/2011 | Lu et al. | |
| 2011/0317460 A1 | 12/2011 | Garces Rivera et al. | |
| 2014/0218986 A1* | 8/2014 | Hasler et al. | 363/123 |

OTHER PUBLICATIONS

A. N. Arvindan et al., "Simulation based Performance Analysis of High Frequency Improved Power Quality Bi-directional Multilevel AC-DC Converters," IEEE Power India Conference, pp. 1-8, 2006.
J. Dixon et al., "Reactive Power Compensation Technologies, State-of-the-Art Review," IEEE vol. 93, No. 12, pp. 2144-2164, 2005.
S. Venkateshwarlu et al., Direct Power Control Strategies for Multi-level Inverter Based Custom Power Devices,: World Academy of Science, Engineering and Technology, vol. 39, 2008, pp. 205-213.
S. Leela et al., "Four Leg Voltage Source Converter based Dynamic Voltage Restorer for Power Quality Improvement in Distribution Networks," International Journal of Computer Applications, vol. 28, No. 3, Aug. 2011, pp. 0975-8887.
I. Yilmaz et al., "Medium Frequency Induction Melting Furnace as a Load on the Power System," IEEE Industry Applications Society Annual Meeting, Oct. 9-13, 2011, pp. 1-12.

(Continued)

*Primary Examiner* — Jared Fureman
*Assistant Examiner* — Aqeel Bukhari
(74) *Attorney, Agent, or Firm* — Nitin N. Joshi (57) ABSTRACT

A power quality management system includes a plurality of phase balancers, each phase balancer including single phase converters coupled between two phase lines and a plurality of controllers to control the plurality of phase balancers. Each controller includes a voltage unbalance detection module to detect amount of voltage unbalance in a plurality of phase lines and a voltage unbalance compensation module to generate reference current commands for each of the single phase converters to reduce the voltage unbalance.

24 Claims, 5 Drawing Sheets

(56) References Cited

OTHER PUBLICATIONS

D. Mohan et al., Dynamic Control and Power Quality Improvement of HVDC System Using Three-Level Double Bridge Voltage Source Converter, 16th National Power Systems Conference, Dec. 15-17, 2010, pp. 380-385.

Z.. Yongqiang et al., "Balancing Compensation of Unbalanced Load Based on Single Phase STATCOM," IEEE 4th International Power Electronics and Motion Control Conference, Aug. 14-16, 2004, vol. 2, pp. 425-429.

* cited by examiner

POWER QUALITY MANAGEMENT SYSTEM AND METHODS OF CONTROLLING PHASE UNBALANCE

BACKGROUND

In a balanced three-phase power system, the individual phase quantities (voltages/currents) are equal in magnitude and are displaced with respect to each other by 120°. Generally, transmission systems are balanced, but distribution power systems, are highly unbalanced. Some of the sources of imbalances include asymmetrical winding impedances of distribution transformers and asymmetrical line impedances. The main source of voltage imbalance at distribution points is the uneven distribution of single phase loads. Another source of imbalance is a fault or other interruption (e.g. for maintenance) along a single phase line. This would create a need for short term balancing until the affected line can be brought back into service. Further, the energy consumption by these loads changes continuously, making the balancing process challenging. Another unbalance problem is a current unbalance seen in a microgrid system at generator output terminals. In the microgrid system, there are multiple single phase loads supplied by a three phase generator. Since these single phase loads are not balanced equally, the current seen by the three phase generator will be unbalanced.

Effects of phase imbalances include increased line losses and heating, equipment overloading, and decreased system stability. Unbalanced phase currents create neutral current flows (if a neutral path exists) leading to additional losses (neutral line losses) on the system. Unbalanced voltages are an issue for three phase loads like induction motors or power-electronic converters, as the negative and zero sequence currents create additional losses. Unbalanced currents also lead to torque pulsations, increased vibrations and mechanical stresses, increased losses, and motor overheating and thus degrade the performance and shorten the life of the induction motors. In power electronic converters, the effects of unbalanced voltages include increased input current distortion, generation of twice the fundamental frequency voltage ripple in the direct current (DC) link and an increased reactive power.

There is currently a very limited ability to alleviate phase imbalances on distribution systems. Manual feeder switching operations to transfer circuits with multiple customers or loads from one phase to another phase at the substation level is one way of balancing an electricity distribution system. Several algorithms have been developed to optimize feeder switch positions. However, the switching is performed in a discrete manner and it cannot dynamically balance the system load.

For these and other reasons, there is a need for the present invention.

BRIEF DESCRIPTION

In accordance with an embodiment of the present invention, a power quality management system is provided. The power quality management system includes a plurality of phase balancers including single phase converters and a plurality of controllers to control the plurality of phase balancers. Each of the single phase converters is coupled between two phase lines and each controller includes a voltage unbalance detection module to detect amount of voltage unbalance in a plurality of phase lines and a voltage unbalance compensation module to generate reference current commands for each of the single phase converters to reduce the voltage unbalance.

In accordance with another embodiment of the present invention, a method of controlling voltage unbalance in a plurality of phase lines include coupling a plurality of phase balancers including single phase converters between two phase lines. The method also includes continuously using voltage feedback signals from the plurality of phase lines for detecting voltage unbalance in the plurality of phase lines and generating reference current commands for each of the single phase converters based on the voltage unbalance.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As used herein, the terms "controller" or "module" refer to software, hardware, or firmware, or any combination of these, or any system, process, or functionality that performs or facilitates the processes described herein.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
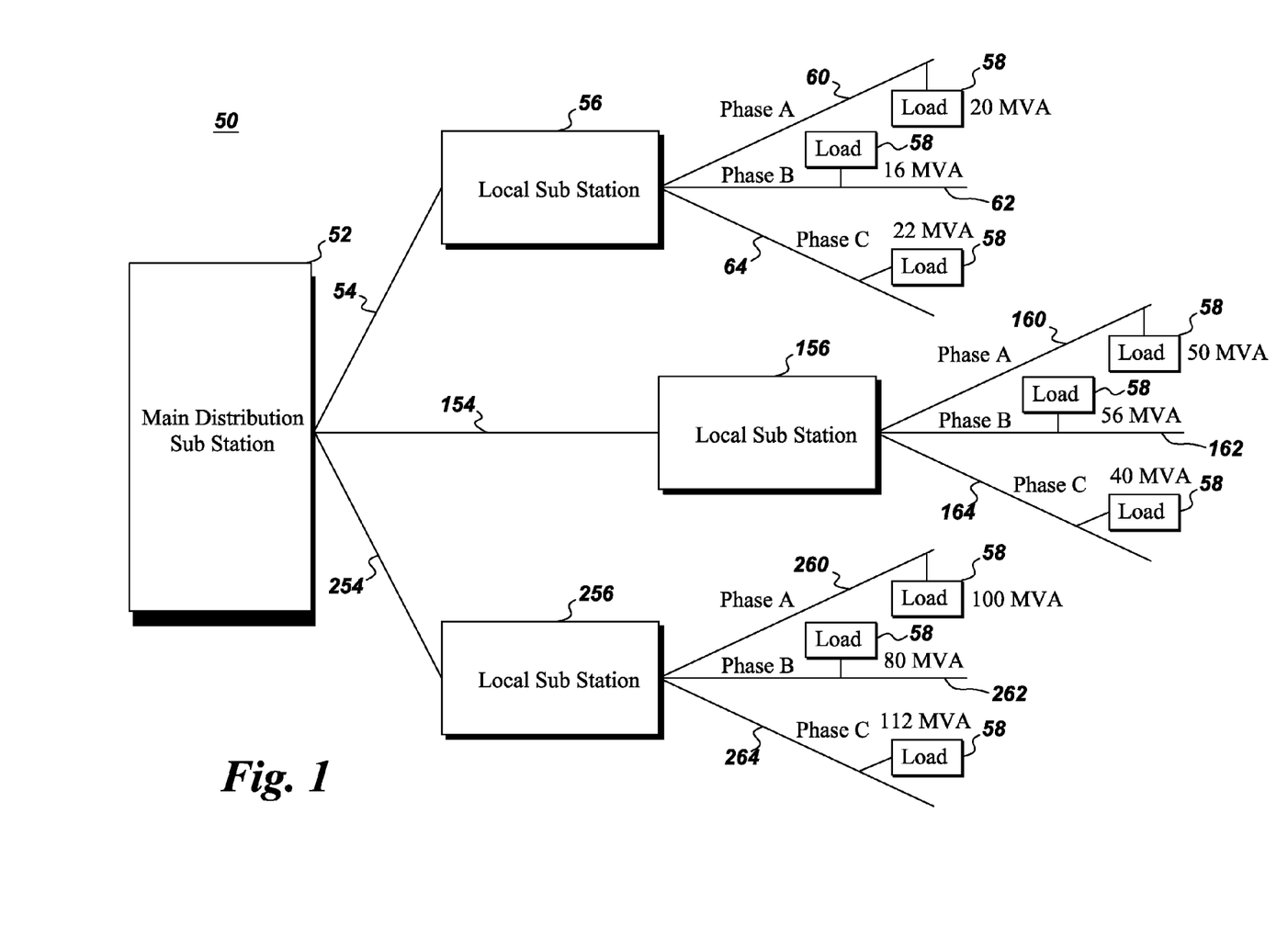
FIG. 1 is a schematic diagram of an unbalanced power distribution system.

FIG. 1 shows an unbalanced power distribution system 50. Power distribution system 50 includes a main distribution substation 52 supplying power to local distribution substations 56, 156, 256 through distribution lines 54, 154, and 254. Local distribution substations 56, 156, 256 then supply power to loads 58 through phase feeder lines 60, 160, 260 for phase A feeder lines, phase feeder lines 62, 162, 262 for phase B feeder lines, and phase feeder lines 64, 164, 264 for phase C feeder lines respectively. It can be seen from the figure that the load distribution on each of the local distribution substations 56, 156, and 256 is unbalanced. For example, substation 56 has 20 MVA (20 ohm) of load on phase A, 16 MVA (25 ohm) of load on phase B and 22 MVA (18.18 ohm) of load on phase C. Similarly load distribution on local distribution substations 156 and 256 is unbalanced. To be balanced the same amount of load would appear on each phase feeder line for a given substation. Further, the time varying nature of the loads compounds the problem of phase unbalance. As a result of unbalanced load distribution on local distribution substations 56, 156 and 256, the load distribution on main distribution substation 52 is also unbalanced. The total phase A load on main distribution substation 52 includes all the phase A loads on local distribution substations 56, 156, 256. Similarly, total phase B and phase C loads on main distribution substation 52 are the sum of respective phase loads on local distribution substations 56, 156, 256. Thus, main distribution substation 52 has 170 MVA load on phase A, 152 MVA load on phase B and 174 MVA load on phase C which reflects an unbalanced load distribution on main distribution substation 52. However, if the main distribution substation is large or if it is a transmission substation, then the geographical diversity may balance out the load distribution on individual phases. In contrast, the local distribution substations 56, 156, and 256 would always see an unbalanced load distribution.

Unbalanced load distribution on three phase lines causes unbalanced currents in those lines and thus unbalanced voltage drops across those lines. For example, assuming a DC circuit for simple calculations and assuming impedance of each of the phase feeder lines 60, 62 and 64 to be equal to 2 ohms, for the local distribution substation voltage of 20 kV on all three phases, each of the phase loads will see a different voltage. Phase A load will observe voltage of 18.18 kV (20−20*2/22), phase B load will observe voltage of 18.51 kV (20−20*2/27) and phase C load will observe voltage of 18.01 kV (20−20*2/20.18). For an AC circuit, which is generally the case, the calculations will be more complex because of phasor terms. It should also be noted here that the voltages calculated above are phase-to-neutral voltages and phase-to-phase voltages will vary depending on star or delta connection. It can be seen from the above calculations that the three phase voltages are unbalanced when the three phase loads are unbalanced. The unbalanced loads also cause a certain amount of current to flow through the neutral wire and results in increased line losses. If the loads were to be balanced (i.e., 20 MVA in each phase) then the voltages would also be balanced and no losses would occur in the neutral wire. Furthermore, this problem also occurs in a microgrid utilizing a 3 phase generator with unbalanced loads.

The voltage unbalance (VU) in percent as defined by the National Electrical Manufacturers Association (NEMA) is given as:

$$\% \text{VU} = 100 * (\text{max deviation from average voltage}) / \text{average voltage} \quad (1)$$

where average voltage is the average voltage of all three voltages. It should be noted here that the line voltages are used in this NEMA standard as opposed to the phase voltages. When phase voltages are used, the phase angle unbalance is not reflected in the % Voltage Unbalance and therefore phase voltages are seldom used to calculate voltage unbalance. For example, with line voltage readings of 230 kV, 232 kV, and 225 kV, the average is 229 kV. The maximum deviation from the average among the three readings is 4 kV. The percent imbalance is 100*4/229=1.7%. Thus, the percent imbalance in a system may be calculated.

Another method used in European standards to indicate the degree of unbalance is the voltage unbalance factor (VUF) which is the ratio of the negative sequence voltage to the positive sequence voltage represented as:

$$\% \text{VUF} = (|V2/V1|) * 100 \quad (2)$$

where V1 and V2 are the positive and negative sequence voltage vectors, respectively. Thus, if there is no negative sequence voltage in the system voltages then it means the system voltages are balanced. As will be appreciated by those skilled in the art, the negative sequence voltage vector V2 rotates in opposite direction compared to the positive sequence voltage vector V1. In accordance with an embodiment of the present invention, currents are injected into phase lines such that the negative sequence voltage is either eliminated or reduced.

Figure 2:
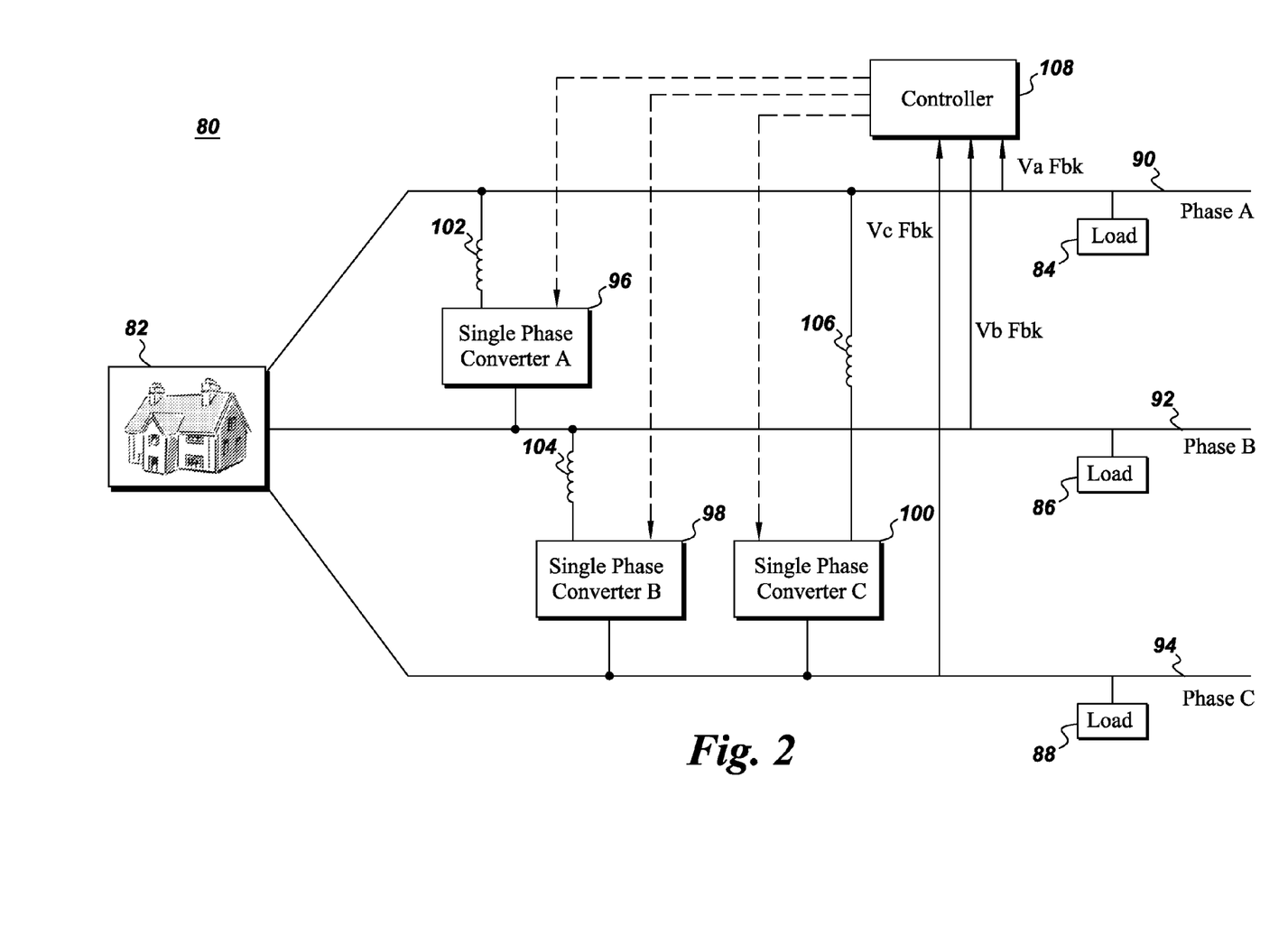
FIG. 2 is a power quality management system for phase balancing in accordance with an embodiment of the present invention.

FIG. 2 illustrates a power quality management system 80 for phase balancing in accordance with an embodiment of the present invention. Phase balancing refers to balancing electrical signals which may be either three phase voltages or three phase currents. A substation 82 supplies power to three single phase loads 84, 86, 88 on three phase lines, phase A (90), phase B (92) and phase C (94) respectively. The loads 84, 86, 88 are only for representative purpose and there can be a plurality of single phase loads on any given phase line. Furthermore, the loads may be negative loads i.e., single phase photovoltaic (PV) inverters supplying back power to the grid. The terminology phase A, phase B and phase C is only for illustration and is not limiting. As discussed earlier, the three phase loads 84, 86, 88 are not balanced and thus result in unbalanced voltages on three phase lines 90, 92 and 94. In another embodiment, element 82 may be a three phase generator utilized in the microgrid supplying power to three single phase loads 84, 86, 88.

In accordance with an embodiment of the present invention, three single phase converters 96, 98 and 100 are connected between the three phase lines 90, 92, 94 through three coupling inductors 102, 104 and 106 to balance voltages. For example, single phase converter 96 is connected between phase A and phase B, single phase converter 98 is connected between phase B and phase C and single phase converter 100 is connected between phase C and phase A. In one embodiment, coupling inductors 102, 104 and 106 may be leakage inductors of transformers (not shown) connecting converters 96, 98 and 100 to the three phase lines 90, 92 and 94. In this embodiment, transformers are used to match output voltages of converters 96, 98 and 100 and phase lines 90, 92 and 94. Furthermore, in a microgrid environment many single phase converters are readily available and thus, new single phase converters need not be installed rather the existing single phase converters can be utilized to balance the voltages by modifying their control schemes. The details of a single phase converter circuit are illustrated in FIG. 3.

The three single phase converters 96, 98 and 100 inject currents into the three phase lines 90, 92 and 94 so as to compensate for voltage or current unbalance. In one embodiment, instead of three single phase converters two single phase converters may also be used to balance the phases. Thus, to balance an N phase system N-1 converters may also be sufficient. The set of these two or three single phase converters may be called as a phase balancer and in a distribution system or in the microgrid utilizing the three phase generator, a plurality of such phase balancers may be utilized at various points or even at a single point to balance the phases in the system. A controller 108 measures three phase voltages or currents from three phase lines 90, 92 and 94 and then provides control signals to three single phase converters 96, 98 and 100 based on amount of phase unbalance detected in three phase lines 90, 92 and 94 The details of controller 108 are illustrated in FIG. 4.

Figure 3:
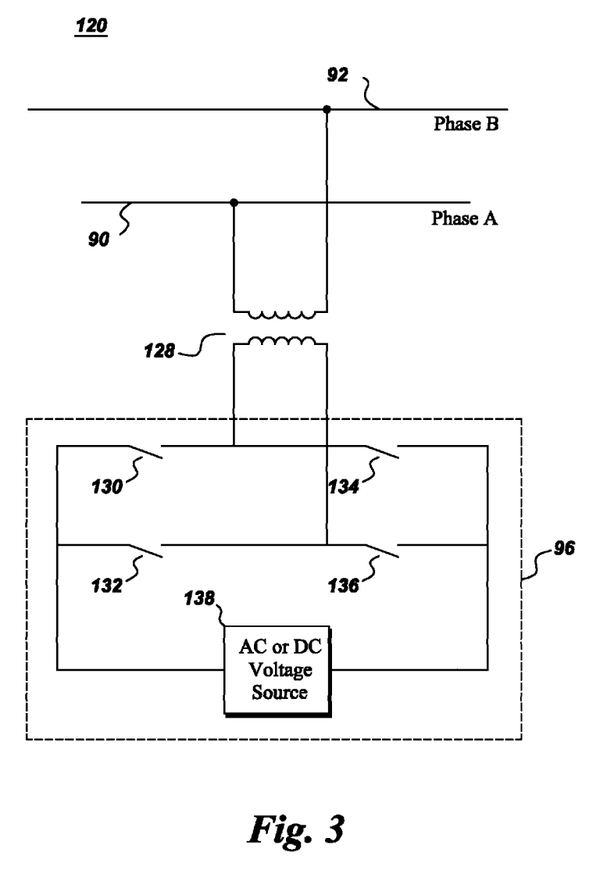
FIG. 3 is a schematic diagram of a single phase converter circuit of FIG. 2 in accordance with an embodiment of the present invention.

FIG. 3 shows a schematic 120 of a single phase converter circuit of FIG. 2. As can be seen a single phase converter 96 is connected between two phase lines 90 and 126 through a transformer 128. Transformer 128 matches an output voltage of converter 96 with a line voltage of phase lines 90 and 92. For example, a rated output voltage of converter 96 may be 600 volts whereas the voltage of phase lines 90 and 92 may be 4 kilo volts (kV). Thus, transformer 128 matches the voltage of these two components.

In the embodiment shown in FIG. 3, single phase converter 96 includes four semiconductor devices 130, 132, 134 and 136 and a voltage source 138. Single phase converter 96 may be a direct current (DC) to alternating current (AC) converter or an AC to AC converter (i.e., a matrix converter). When single phase converter 96 is a DC to AC converter, voltage source 138 is a DC voltage source and semiconductor devices 130, 132, 134 and 136 are unidirectional devices. On the other hand, when single phase converter 96 is a matrix converter voltage source 138 is an AC voltage source and semiconductor devices 130, 132, 134 and 136 are bidirectional devices. In other embodiments, any other single phase converter such as a current source converter connected to the phase lines 90 and 92 through coupling capacitors rather than transformer 128 may be utilized. In yet another embodiment, single phase converter 96 may be may be a multilevel converter.

Figure 4:
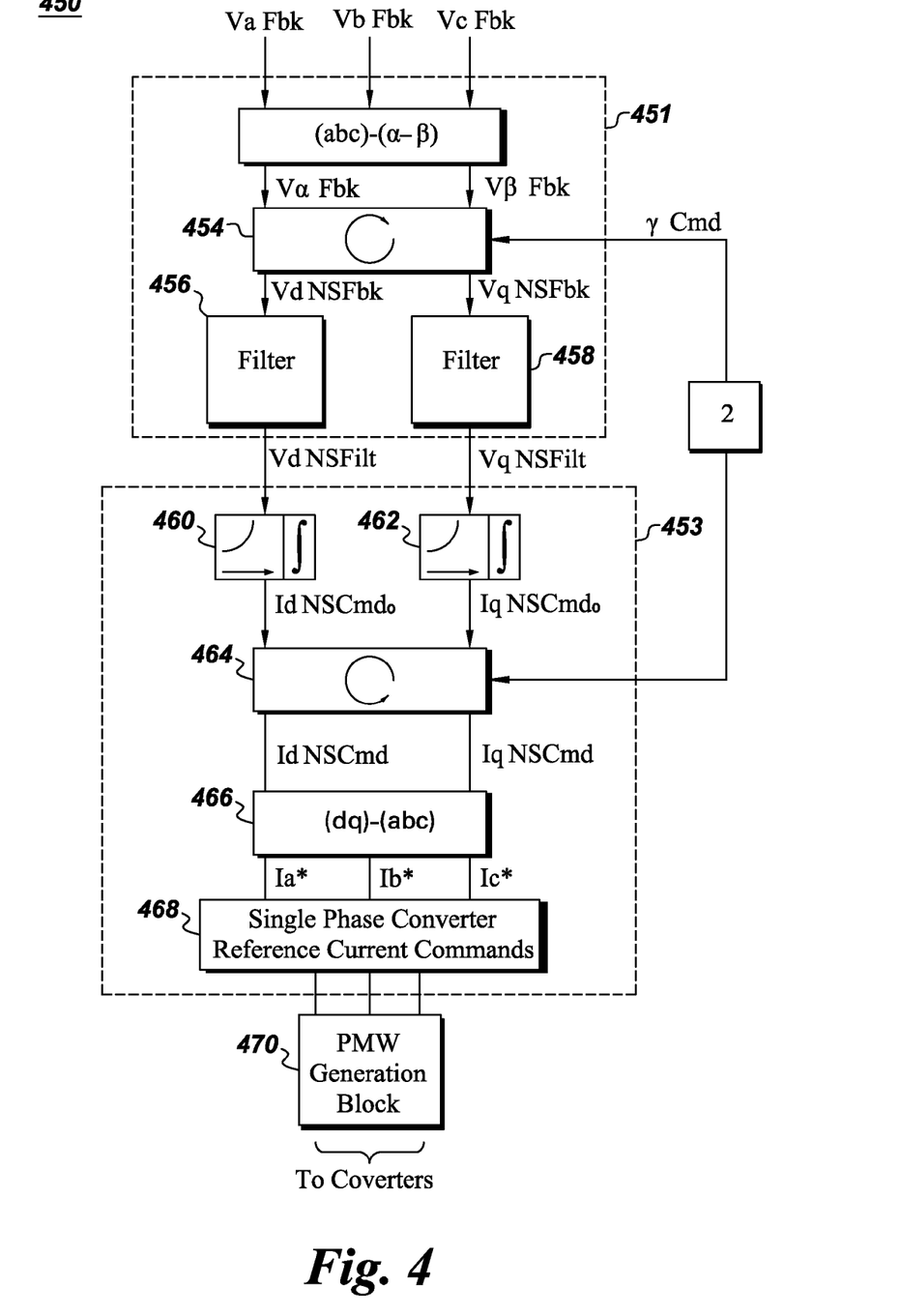
FIG. 4 is a block diagram of a controller of FIG. 2 in accordance with an embodiment of the present invention.

FIG. 4 shows a block diagram of controller 108 of FIG. 2. Controller 108 includes a voltage unbalance detection module 451 to detect amount of voltage unbalance in the system and a voltage unbalance compensation module 453 to generate appropriate reference current commands for single phase converters. Feedback voltage signals Va_Fbk, Vb_Fbk and Vc_Fbk measured at three phase lines are converted into two 90° phase shifted components or α-β components Vα_Fbk, Vβ_Fbk using a Clarke's transformation matrix 452. In one embodiment, Clarke's transformation matrix 452 is given as below:

$$\sqrt{\frac{2}{3}} \begin{bmatrix} \frac{1}{\sqrt{2}} & 1 & 0 \\ \frac{1}{\sqrt{2}} & -\frac{1}{2} & \frac{\sqrt{3}}{2} \\ \frac{1}{\sqrt{2}} & -\frac{1}{2} & -\frac{\sqrt{3}}{2} \end{bmatrix} \quad (1)$$

A second transformation matrix 454 is used to rotate the α-β voltage components Vα_Fbk, Vβ_Fbk backward with a phase angle γ_cmd to obtain two d-q domain negative sequence voltage components Vd_NSFbk and Vq_NSFbk. The phase angle γ_cmd represents phase angle of a vector comprising three phase line voltages Va_Fbk, Vb_Fbk and Vc_Fbk and is provided by a phase locked loop (PLL) (not shown).

Average values of two d-q domain negative sequence voltage components Vd_NSFbk and Vq_NSFbk represent the amplitude of the "negative sequence" voltages and are an indication of the presence of voltage imbalance in the system. In one embodiment, to obtain the average values of negative sequence voltage components low pass filters 456, 458 are used. In another embodiment, low pass filters 456 and 458 may comprise discrete "Floating average" filters. Discrete "Floating average" filters provide better filtering of the negative components by calculating the average of the sum of the last of samples stored during a time equal to the period of the frequency that should be eliminated.

The desired value of filtered negative sequence voltage signals Vd_NSFilt and Vq_NSFilt should always be zero to obtain balanced phase voltages. To facilitate this condition, both negative sequence voltage components Vd_NSFilt and Vq_NSFilt are fed to negative sequence voltage regulators 460 and 462 to generate d-q domain negative sequence current components Id_NScmd$_0$ and Iq_NScmd$_0$ which when injected into the system will reduce voltage unbalance. Negative sequence voltage regulators 460 and 462 may include a proportional (P) controller or a proportional integral (PI) controller or any other suitable controller known to a person skilled in the art. The d-q domain negative sequence current components Id_NScmd$_0$ and Iq_NScmd$_0$ are then transformed forward with twice the angle (2γ_cmd) using a third transformation block 464 to generate synchronous d-q components Id_NScmd and Iq_NScmd. The transformation results in bringing the negative sequence regulator output signals to a d-q synchronous reference frame.

Synchronous d-q components Id_NScmd and Iq_NScmd from transformation matrix 464 are converted into a-b-c domain negative sequence current compensation commands Ia*, Ib* and Ic* by a reverse transformation matrix 466. Further, it should be noted negative sequence current compensation commands Ia*, Ib* and Ic* needs to be injected into each phase of three phase lines to balance the voltages whereas the single phase converters inject currents from one phase to another i.e., line currents. Thus, appropriate conversion 468 from negatives sequence current compensation commands to reference output current commands may be needed. In one embodiment, the conversion may be given as:

$$\begin{bmatrix} I_{AB}^* \\ I_{BC}^* \\ I_{CA}^* \end{bmatrix} = \begin{bmatrix} \frac{1}{3} & -\frac{1}{3} & 0 \\ -\frac{2}{3} & -\frac{1}{3} & 0 \\ \frac{1}{3} & -\frac{2}{3} & 0 \end{bmatrix} \begin{bmatrix} Ia^* \\ Ib^* \\ Ic^* \end{bmatrix} \quad (2)$$

where $I_{AB}^*$, $I_{BC}^*$, and $I_{CA}^*$ represent reference output current commands for single phase converters connected between phases A-B, B-C and C-A respectively. In an embodiment, when only two converters (A-B, B-C) are used instead of three converters (A-B, B-C and C-A) to balance the voltages, then the same equation may be replaced with:

$$\begin{bmatrix} I_{AB}^* \\ I_{BC}^* \end{bmatrix} = \begin{bmatrix} 1 & 0 & 0 \\ 0 & 0 & 1 \end{bmatrix} \begin{bmatrix} Ia^* \\ Ib^* \\ Ic^* \end{bmatrix} \quad (3)$$

It should be noted that in certain cases when the amount of voltage unbalance present in the system is very high, it may not be feasible to completely remove the voltage unbalance from the system. In such cases, appropriate current or voltage limiters are placed in controller 108 to limit the amount of voltage or current generated by single phase converters and thus, the voltage unbalance is reduced or minimized. Furthermore, in some embodiments, transformation blocks 452 and 454 may be converted into a single transformation block. Similarly, transformation blocks 464 and 466 may be converted into a single transformation block.

In one embodiment, if single phase converters used in the system are current source converters then reference output current commands $I_{AB}^*$, $I_{BC}^*$, and $I_{CA}^*$ may be provided directly to a pulse width modulation (PWM) generation block 470 to generate PWM pulses for single phase converters. In another embodiment, if the single phase converters are voltage source converters then reference output current commands $I_{AB}^*$, $I_{BC}^*$, and $I_{CA}^*$ may further need to be converted into reference output voltage commands $V_{AB}^*$, $V_{BC}^*$, and $V_{CA}^*$ (not shown) which are then provided to PWM generation block 470. In yet another embodiment, even though voltage source converters are used in the system, reference output current commands $I_{AB}^*$, $I_{BC}^*$, and $I_{CA}^*$ may be provided to PWM generation block 470 and then PWM generation block 470 uses a hysteresis current controller to generate PWM pulses for the converters. Finally, based on PWM pulses from PWM generation block 470 single phase converters 96, 98, 100 (FIG. 2) generate appropriate voltages or currents to balance voltages of three phase lines 90, 92, 94 (FIG. 2).

Figure 5:
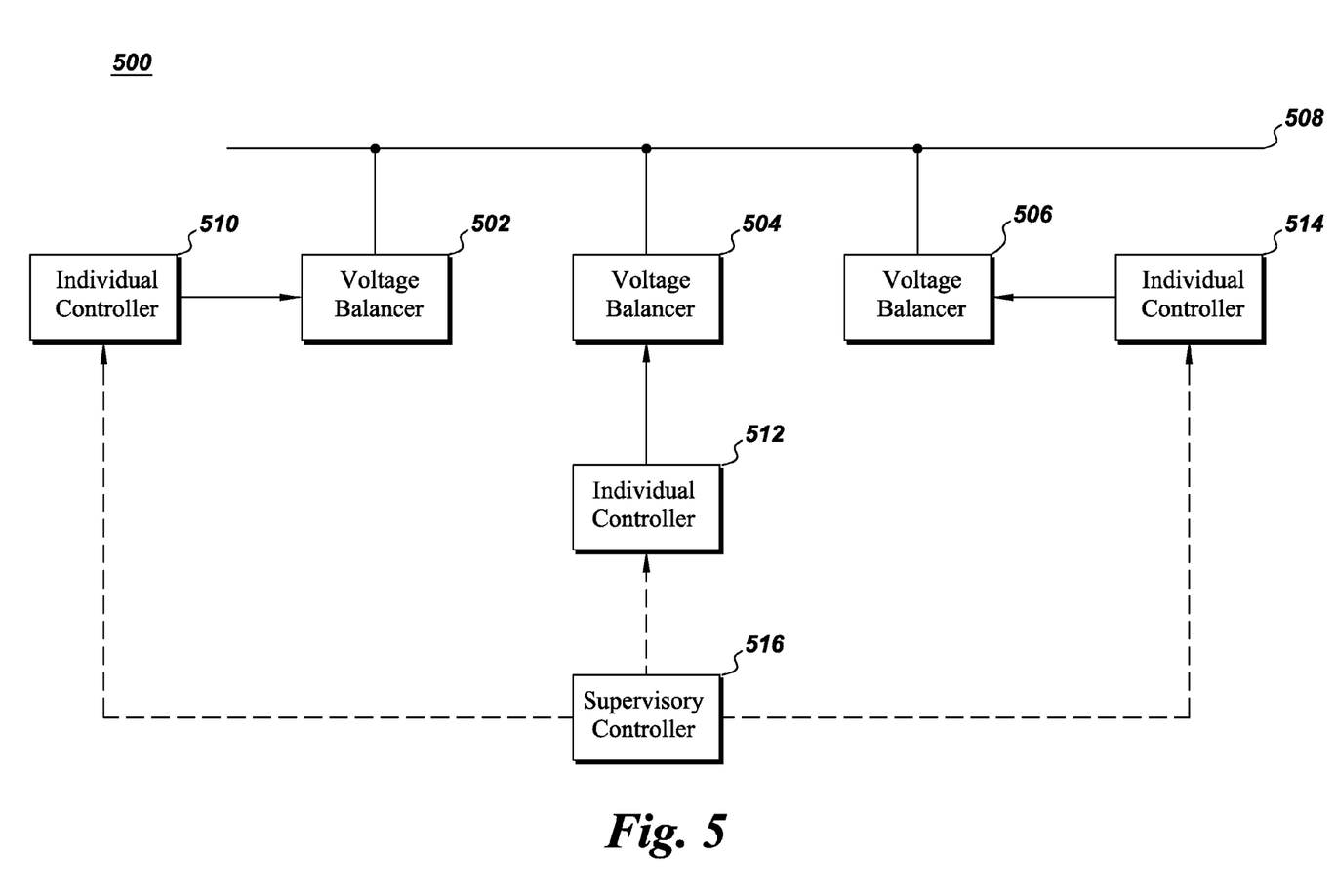
FIG. 5 is a single line diagram of a distribution system utilizing a plurality of phase balancers.

FIG. 5 illustrates a single line diagram 500 of a distribution system utilizing a plurality of phase balancers. As described earlier each of the phase balancers 502, 504 and 506 include a set of two or three single phase converters connected between two phases for a 3 phase system. It should be noted that since this is a single line diagram all phase balancers are shown to be connected to a single line 508 which represents a 3 phase system. In accordance with an embodiment of the present invention, a distributed supervisory control system including an individual controller (510, 512 or 514) for each of the phase balancers 502, 504 and 506 is utilized. Further, a supervisory controller 516 which also monitors and controls other elements of the distribution system sends control signals to individual controllers 510, 512 and 514. It should be noted that even though supervisory controller 516 is shown only at one location, it may be considered as a software module which can be installed as a single part or as multiple parts across multiple locations. Once supervisory controller 516 detects voltage unbalance in the system, it may first consider other voltage balancing controls such as controlling loads across various phases and then determine new voltage unbalance amount and send appropriate control signals to individual controllers 510, 512 and 514.

In another embodiment, a swarm intelligence system may be utilized to control individual controller 510, 512 and 514. In this embodiment, the individual controllers 510, 512 or 514 may communicate among each other and transfer information such as the amount of voltage unbalance that has been detected or the amount of voltage unbalance each phase balancer is going to compensate for or even any adverse state in the system. Based on the communicated information individual controllers may adjust their own control commands. For example, in one embodiment, individual controllers 510, 512 or 514 track the status of each other and adjust their output according to need. Thus, if any of the phase balancers 502, 504 and 506 is unable to correct voltage unbalance sufficiently, controllers in the neighborhood would detect the deficiency and respond to bring voltage unbalance within acceptable bounds.

One of the advantages of the proposed power quality management system is it provides dynamic control for balancing phase line voltages or currents as load or demand on each phase changes. This feature could be easily added to any microgrid system at minimal cost by utilizing existing single phase converters.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power quality management system comprising:
    a plurality of phase balancers including single phase converters, each of the single phase converters coupled between two phase lines;
    a plurality of controllers to control the plurality of phase balancers, each controller comprising:
        a voltage unbalance detection module to detect amount of voltage unbalance in a plurality of phase lines; and
        a voltage unbalance compensation module to generate reference current commands for each of the single phase converters to reduce the voltage unbalance.

2. The power quality management system of claim 1, wherein single phase converters include voltage source converters and current source converters.

3. The power quality management system of claim 2, wherein the voltage source converters are coupled between two phase lines via coupling inductors.

4. The power quality management system of claim 2, wherein the voltage source converters are coupled between two phase lines via transformers.

5. The power quality management system of claim 2, wherein the voltage unbalance compensation module includes a hysteresis controller.

6. The power quality management system of claim 1, wherein each of the single phase converters is coupled between a separate pair of two phase lines.

7. The power quality management system of claim 1, wherein single phase converters include direct current (DC) to alternating current (AC) converters or AC to AC converters.

8. The power quality management system of claim 7, wherein the DC to AC converter includes unidirectional semiconductor switches and the AC to AC converters include bidirectional semiconductor switches.

9. The power quality management system of claim 1, wherein single phase converters include multilevel converters.

10. The power quality management system of claim 1, wherein the voltage unbalance detection module comprises a first transformation matrix to convert voltage feedback signals measured at the plurality of phase lines into d-q domain negative sequence voltage components by rotating respective $\alpha$-$\beta$ voltage components backwards with a phase angle.

11. The power quality management system of claim 10, wherein the phase angle includes an angle of a vector comprising three phase line voltages of the plurality of phase lines.

12. The power quality management system of claim 10, wherein the voltage unbalance detection module comprises low pass filters configured to generate d-q domain negative sequence average voltages by filtering the d-q domain negative sequence voltage components.

13. The power quality management system of claim 12, wherein the low pass filters each comprise a floating average filter.

14. The power quality management system of claim 12, wherein the voltage unbalance compensation module comprises negative sequence voltage regulators configured to determine d-q domain negative sequence current components from the d-q domain negative sequence average voltages.

15. The power quality management system of claim 10, wherein the voltage unbalance compensation module comprises a second transformation matrix to transform d-q domain negative sequence current components into a-b-c domain negative sequence current commands for each phase.

16. The power quality management system of claim 1 further comprising a current to voltage converter for converting reference current commands for each of the single phase converters into reference voltage commands for each of the single phase converters.

17. The power quality management system of claim 1 further comprising a central controller to coordinate the operation of the plurality of controllers.

18. The power quality management system of claim 1, wherein the plurality of controllers coordinate among themselves to reduce the voltage unbalance.

19. A method of controlling voltage unbalance in a plurality of phase lines comprising:
coupling a plurality of phase balancers including single phase converters between two phase lines;
continuously using voltage feedback signals from the plurality of phase lines for detecting voltage unbalance in the plurality of phase lines; and
generating reference current commands for each of the single phase converters based on the voltage unbalance.

20. The method of claim 19, wherein detecting voltage unbalance comprises converting voltage feedback signals measured at the plurality oh phase lines into d-q domain negative sequence voltage components by rotating respective $\alpha$-$\beta$ voltage components backwards with a phase angle.

21. The method of claim 20, wherein the generating reference current commands for each of the single phase converters comprises providing negative sequence voltage regulators configured to determine d-q domain negative sequence current components from the d-q domain negative sequence average voltages.

22. The method of claim 19, wherein single phase converters include voltage source converters and current source converters.

23. The method of claim 19, wherein single phase converters include direct current (DC) to alternating current (AC) converters or AC to AC converters.

24. The method of claim 19 further comprising converting reference current commands for each of the single phase converters into reference voltage commands for each of the single phase converters.

* * * * *